March 13, 1928. 1,662,650
E. G. WESSMAN
CUP DISPENSER
Filed July 20, 1921 9 Sheets-Sheet 2

Inventor:
Edwin G. Wessman,
Milans & Milans
Attorneys.

Witness:
Jas E Hutchinson

March 13, 1928.  
E. G. WESSMAN  
CUP DISPENSER  
Filed July 20, 1921  
1,662,650  
9 Sheets-Sheet 3

Fig. 5.

Witness:  
James Hutchinson

Inventor:  
Edwin G. Wessman,  
By Milans & Milans  
Attorneys

March 13, 1928.  
E. G. WESSMAN  
CUP DISPENSER  
Filed July 20, 1921  
1,662,650  
9 Sheets-Sheet 4

March 13, 1928. 1,662,650
E. G. WESSMAN
CUP DISPENSER
Filed July 20, 1921 9 Sheets-Sheet 5

Inventor:
Edwin G. Wessman,
By Milans & Milans,
Attorneys.

Witness:
Jas. E. Hutchinson.

March 13, 1928. 1,662,650
E. G. WESSMAN
CUP DISPENSER
Filed July 20, 1921 9 Sheets-Sheet 7

Witness:
Jas. C. Hutchinson

Inventor:
Edwin G. Wessman,
By Milans & Milans, Attorneys

March 13, 1928.　　　　　E. G. WESSMAN　　　　　1,662,650
CUP DISPENSER
Filed July 20, 1921　　　9 Sheets-Sheet 8

Witness:
Jas E Hutchinson

Inventor:
Edwin G. Wessman
By Milans & Milans, Attorneys

Patented Mar. 13, 1928.

1,662,650

UNITED STATES PATENT OFFICE.

EDWIN G. WESSMAN, OF BOONTON, NEW JERSEY, ASSIGNOR, BY MESNE ASSIGNMENTS, TO INDIVIDUAL DRINKING CUP COMPANY, INC., OF EASTON, PENNSYLVANIA, A CORPORATION OF PENNSYLVANIA.

CUP DISPENSER.

Application filed July 20, 1921. Serial No. 486,071.

This invention relates to dispensing devices, and more especially to cup dispensers of the type comprising a container for a stack of nested paper cups, and mechanism for delivering the cups singly therefrom.

An object of the invention is to provide improved mechanism for separating and ejecting the terminal cup from the nested stack, to provide improved mechanism for this purpose that will exert a continuous positive control over the cups throughout the separating and ejecting operation without injury to the cups, and that will be thoroughly reliable and durable in use.

Another object of the invention is to provide improved actuating or operating means for the delivery mechanism whereby the operation of the delivery mechanism and the removal of a cup by the user can be more advantageously performed.

A still further object of the invention is to provide an improved closure and closure locking means for the container.

An important feature of the invention lies in the provision of an improved closure and locking means in the form of a single compact unit separate from the other part of the apparatus and adapted to be readily connected thereto.

An important novel characteristic of the invention also resides in the special locking means provided for the container and the operating means, whereby said locking means and that for the closure have a common control.

The invention, with other objects and advantages thereof, and the particular construction, combinations and arrangements of parts comprising the same will be understood from the hereinafter contained detailed description when considered in connection with the accompanying drawings, forming part hereof, and illustrating one embodiment of the invention.

While a specific embodiment of the invention is illustrated in the drawings, it will, of course, be understood that this is by way of example and that changes and variations of the particular construction illustrated and the carrying out of the invention in other forms as will appeal to those skilled in the art and falling within the scope of the appended claims, may be practiced without departing from the spirit of the invention.

The type of cup illustrated in the drawings is a commercial form of paper cup, frusto-conical in shape and provided with an outwardly directed flange at the top. The bottom is slightly above the lower end of the cup, the flanges of the cups being spaced when the cups are nested.

Referring to the drawings in detail, A designates a casing preferably of metal, which forms a support for the cup container and the delivery mechanism. The casing A, which is shown as of general cylindrical form with substantially rectangularly shaped extensions 1, at the front and rear, has integral flanges or bracket portions 2 adapted to be secured by screws 3 to any suitable support. Extending upwardly from the top of the casing is a socket 4 in which the lower end of the cup container B is seated, the latter being preferably of glass and closed at its upper end as shown. The cup container is provided at its lower end with a metal collar 5 and is detachably secured to the casing by inclined faced lugs 6, 7 on the collar and casing.

Figures 1, 2:
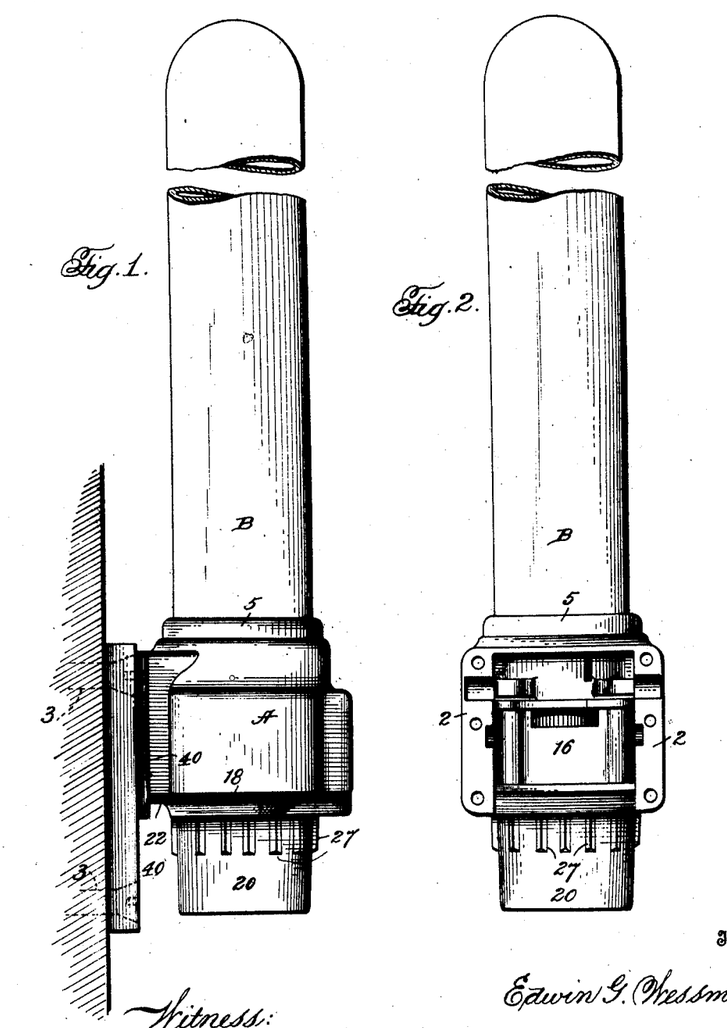
Figure 1 is a side elevation of a cup dispenser constructed in accordance with the present invention.
Figure 2 is a rear elevation of the apparatus without the closure and locking mechanism.
Figure 3:
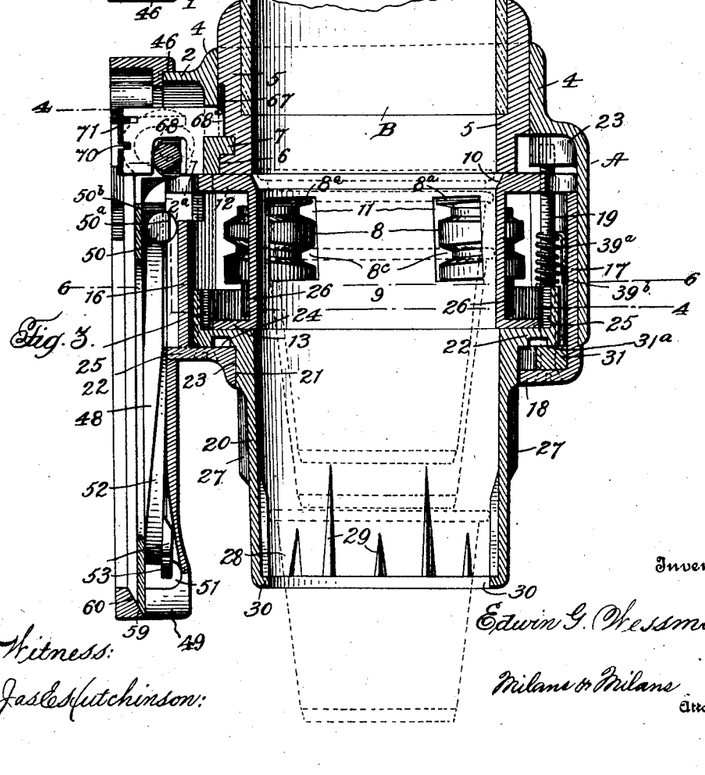
Figure 3 is a vertical section on an enlarged scale through the casing.
Figure 4:
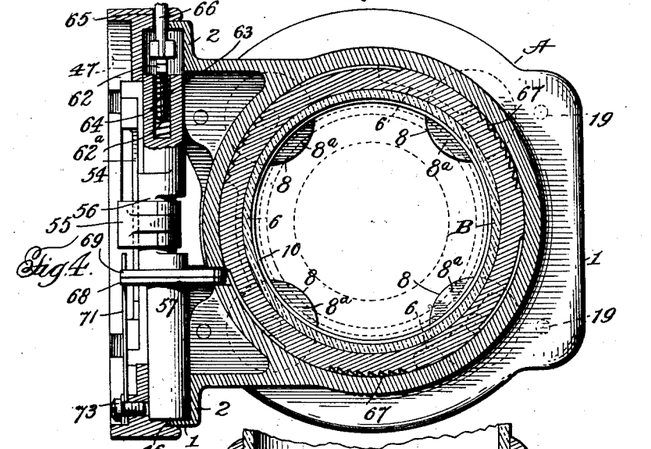
Figure 4 is a transverse section on the line 4—4 of Fig. 3.
Figure 5:
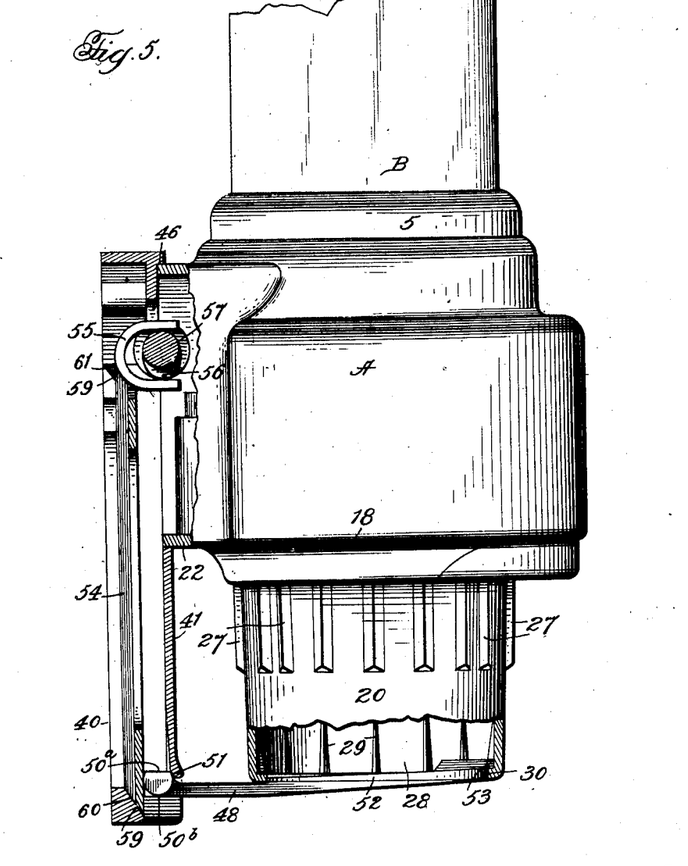
Figure 5 is a partial side elevation with parts shown in section.
Figure 6:
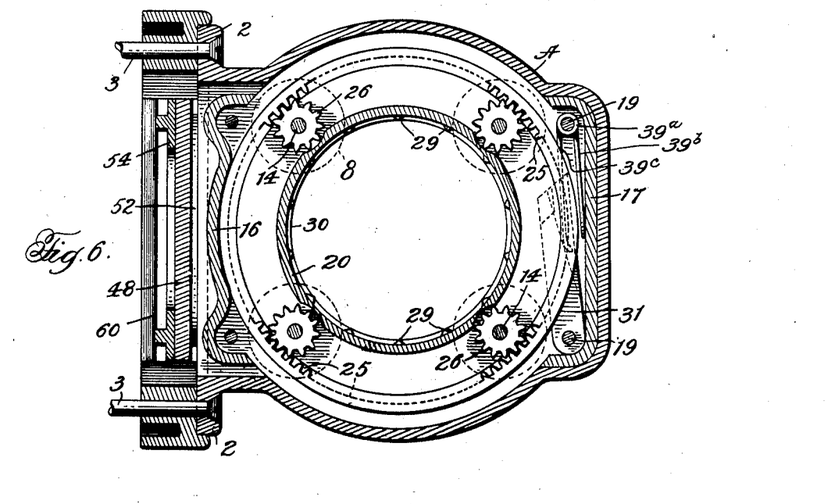
Figure 6 is a transverse section on the line 6—6 of Fig. 3.
Figure 18:
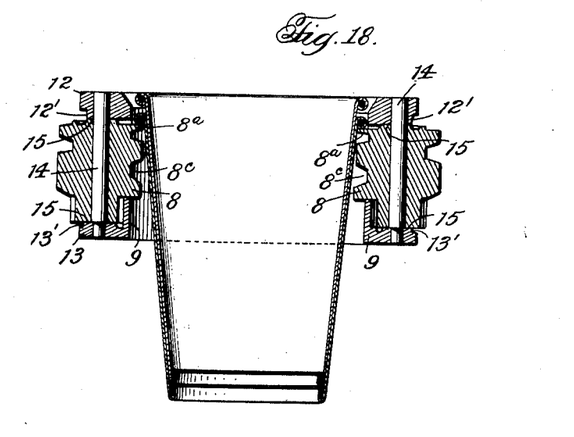
Figure 18 is a detail vertical section of the delivery worms and carrier therefor.
Figure 19:
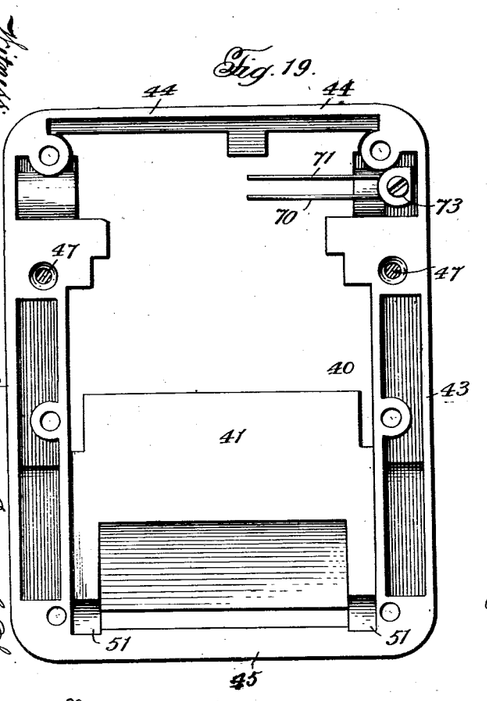
Figure 19 is a front elevation of the lock casing without the lock mechanism.
Figure 20:
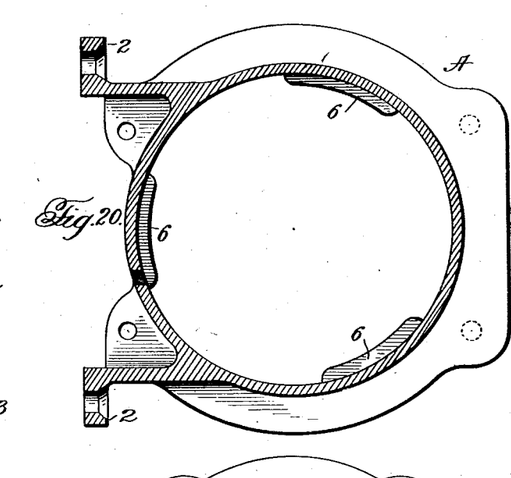
Figure 20 is a transverse section through the main casing, the delivery mechanism being removed.
Figure 21:
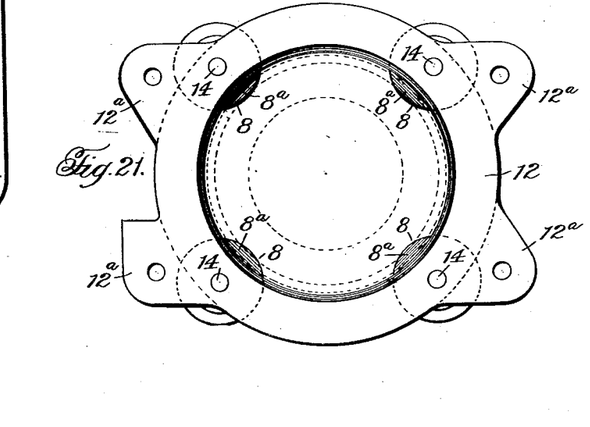
Figure 21 is a top plan view of the delivery worms and carrier.
Figure 22:
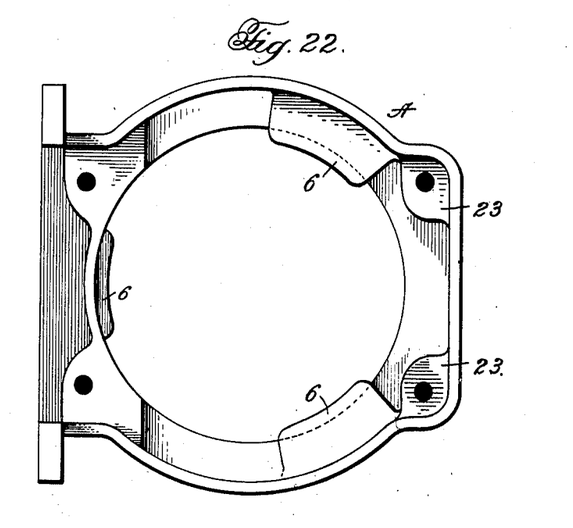
Figure 22 is a top plan view of the main casing member.
Figure 23:
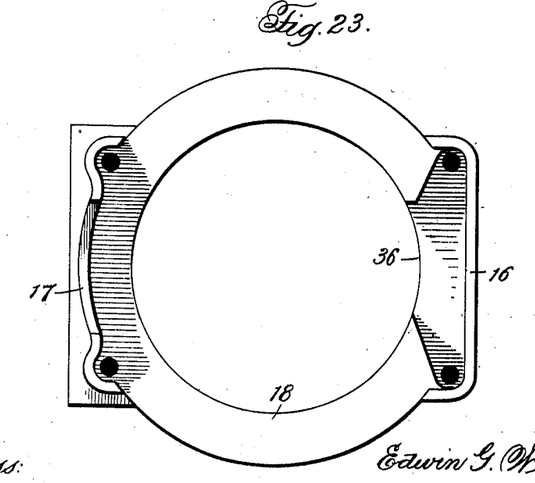
Figure 23 is a top plan view of the bottom plate of the casing.
Figures 24, 25, 26:
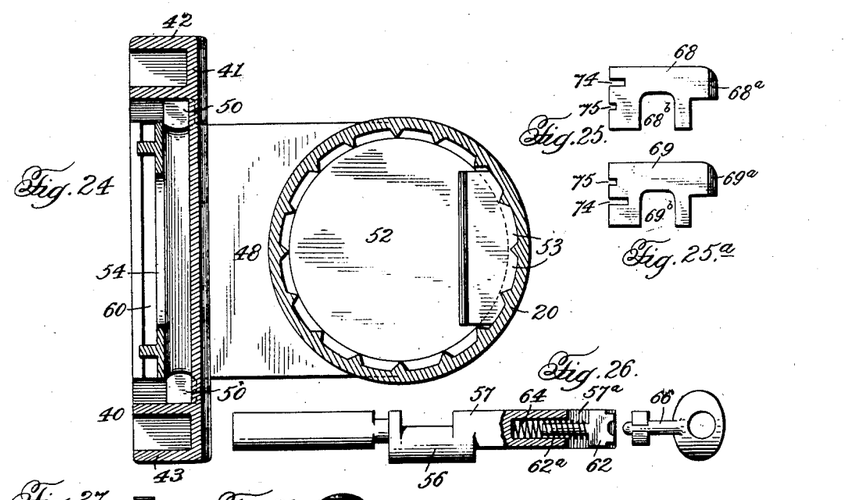
Figure 24 is a detail view of the closure mechanism.
Figures 25 and 25ª are detail views of the pawls of the container-locking means.
Figure 26 is a detail view of the closure-locking means.
Figures 27, 28:
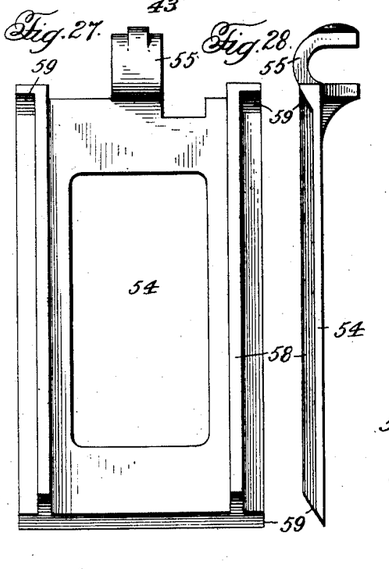
Figures 27 and 28 are detail views of the lock plate.
Figures 29, 30:
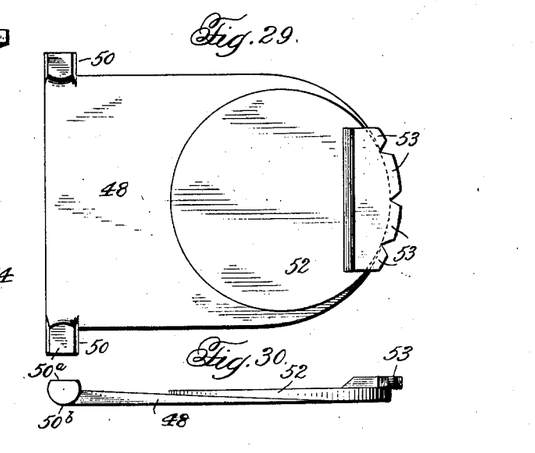
Figure 29 is a top plan view of the closure plate.
Figure 30 is a side elevation of the closure plate.

Referring particularly to Figs. 3, 4, 8, and 18 of the drawings, the mechanism for supporting the stack of cups, and for separating and feeding the cups singly from the container, comprises a plurality of rotary escapement or worm members 8 disposed about the lower end of the container in position to engage the flanges of the cups, four of such worm members being shown in the present instance, equally spaced from each other. The worm members 8 are associated with a cylindrical part or member 9, the interior diameter of which is substantially equal to that of the cup container, and which is arranged with its upper part immediately below the position occupied by the lower end of the container and in axial alignment therewith, said cylindrical part or member at its upper end having a beveled face 10 and forming substantially a continuation of the container B. The cylindrical member 9 has a plurality of openings 11, one for each worm, and the latter are supported to extend longitudinally of the cylindrical part 9, with portions thereof extending inwardly through the openings 11 beyond the inner face of the cylindrical part 9. The worm members 8 are adapted to support the stack of cups as indicated in Fig. 18, the flange of the lowermost cup resting upon the top face portions 8ª of the uppermost threads or ribs of the worm members. The worm members 8 operate in unison, and upon rotation thereof from the positions shown in Fig. 9, the top face portions 8ª of the worms move out of engagement with the flange of the lowermost cup, and the cup flange is engaged by the threads or spiral rib portions 8ᶜ of the worms, and the cup advanced, the flange of the succeeding cup being caught and temporarily held by the topmost face portions 8ª of the worms, as illustrated in Fig. 3 of the drawings.

The worm members 8, which are of the same construction, may be, and preferably are, as shown, provided with thread portions of different pitch, the worm gradually increasing in pitch downwardly from the upper portion thereof, and they are also preferably, as shown, arranged with their axis of rotation extending at an inclination in planes parallel with the longitudinal axis of the container, these features of construction being important in affording a nice adjustment of the worm members to properly engage the flanges of the cups, and being instrumental in obtaining a smooth, easy, positive feeding and separation of the cups without injury, the increasing pitch of the worms functioning to gradually separate the cups during the feeding operation.

In the particular construction illustrated in the drawings, the worm members 8 and cylindrical part or member 9 are combined as a single unit. The cylindrical part or member 9 is provided with upper and lower lateral flanges 12—13 between which the worm members 8 are supported, said flanges 12—13 having bearings 12′, 13′ that are engaged by journals 14, and bearing faces 15 at the upper and lower ends of the worm members, the cylindrical part or member 9 serving as a carrier for the worms. The carrier with the worm members is supported within the casing A upon upstanding walls 16, 17, on a bottom plate 18 of the casing, the upper flange 12 having corner extensions 12ª resting upon the upper ends of said walls. The bottom plate 18 corresponding in shape to the contour of the casing is removably secured in place by screws 19 passing through openings in the bottom plate, and at their upper portions engaging threaded openings in lugs 23 on the casing A, said screws 19 also engaging openings in the corner extensions 12ª of the worm carrier, and serving to firmly secure the parts together.

The operating means for the rotary escapement or worm members 8 includes a tubular part 20 supported for axial rotation on the bottom plate 18 of the casing. The bottom plate 18 has a circular opening and an annular bearing 21, and the tubular part 20, at its upper portion, is provided with a collar 22 and an outer cylindrical bearing face 23 rotatably engaging, respectively, the upper face 24 and annular bearing 21 of the bottom plate. Extending upwardly from the collar 22 is an actuator ring in the form of an internal gear 25, the latter meshing with pinions 26 on the lower ends of the worm members 8, the lower end of the cylindrical part 9 and its lower flange 13 of the worm carrier extending within the internal gear ring 25 but being supported free of the upper face of the collar 22. As will be understood, upon rotation of the tubular part 20, the worm members will be simultaneously rotated. The tubular part 20, which is adapted to be grasped by the hand of the operator and turned, may be provided with any suitable form of outer face that will afford a good hand grip. In the drawings, the tubular part 20 is shown provided on its outer face at the upper part thereof with longitudinally extending ribs 27 for this purpose.

The tubular part 20, extending in axial alignment with the container B and the cylindrical part 9, and forming a substantial continuation thereof, serves as a housing for the lower portion of the terminal cups of the stack, and is adapted to receive the cups as they are delivered from the container B by the delivery mechanism, and to hold the cups in position for withdrawal with a portion of the cup projecting beyond the lower end thereof. The tubular part 20, which is illustrated as slightly conical, has a restricted throat portion 28 at its lower part, said throat portion being of slightly less diameter than that of the cup flange, so that when the cup is delivered by the feeding mechanism, it will be retained by the engagement of the cup flange with said restricted throat portion (as illustrated in Fig. 3 of the drawings) from which the cup may be readily removed by a slight pull. The restricted throat portion 28 is shown in the drawings as formed by tapering ribs 29 on the inner face of the tubular part 20, and an inwardly extending annular lip or flange 30 at the lower end thereof. In the use of the apparatus, the upper portion of the tubular part 20, having the ribs 27, is gripped by the hand of the user and given a partial rotation, the hand still extending around the tubular part 20 is then slid downwardly over said tubular part to the cup projecting therefrom, the hand being contracted to grip the cup and the cup being removed by a continued downward movement of the hand, the operation being performed by practically a single continuous movement of the hand.

The tubular part 20 is adapted to be operated in one direction, (that indicated by the arrow in Fig. 16), the operative connection between said tubular part 20 and the worm members 8 being such that only a relatively small amount of turning movement is sufficient to effect the delivery of a cup. In the particular construction shown, one-seventh turn of the tubular part is sufficient. Means are provided for automatically determining and limiting the extent of continuous rotation of the tubular operating part whereby said tubular part can only be rotated a predetermined amount and the delivery mechanism is only operated to deliver a single cup upon each operation or stroke of the tubular operating member. Referring particularly to Figures 6, 7, 15, 16 and 17 of the drawings, the means for this purpose consists of pawl and ratchet mechanism, shown, as comprising a ratchet on the bottom face of the collar 22, and a pawl 31 mounted in a recess 32 in the upper face of the bottom plate 18 at its front part. The ratchet comprises an outer series of teeth C equally spaced in a ring about the outer marginal portions of the bottom face $31^a$ of the collar 22, and an inner circular series of teeth D arranged at regular intervals at the inner marginal portions of said face $31^a$, the teeth of the respective series being alternately arranged. The teeth C are substantially triangular in shape, having a relatively short front pawl abutting face $c'$ and a longer inclined inwardly disposed side face $c^2$. The teeth D of the inner series each have a pawl-abutting end face $d'$, and a relatively long side face having a portion $e-f$ extending circumferentially substantially in alignment with the inner edge of the faces $c'$ of the teeth C, and an inclined portion $h$ extending inwardly therefrom to the inner margin of the collar 22 and the adjoining cylindrical bearing face part 23, the latter forming an inner boundary wall for the series of teeth. The pawl abutting end faces $d'$ of the inner series of teeth D face in the opposite direction to that of the pawl abutting front faces $c'$ of the outer series of teeth $c$.

The pawl 31 is pivotally supported for movement relatively to the teeth $c, d$, of the ratchet, the pawl being provided at one end with a bearing 33 engaging one of the securing bolts 19. The pawl 31, at its free end, has a beveled face 34 and is provided on its upper side with a tooth 35, the free end of the pawl working through an opening 36 in the wall of the annular bearing 21 of the bottom plate 18. The tooth 35 of the pawl is provided with inclined end faces 37, 38, to engage respectively, and corresponding in size, and angle to the front faces $c'$ of the teeth C and the end faces $d'$ of the teeth D of the outer and inner series of ratchet teeth, the tooth 35 of the pawl being of a length to pass through the spaces $g$ between adjacent pawl abutting faces $c, d'$ of the series of teeth. 39 designates a spring that exerts forwardly directed pressure upon the free end of the pawl 31, said spring having an intermediate coil 39$^a$ engaging around one of the securing bolts 19, and upper and lower arms 39$^b$, 39$^c$, respectively, bearing against the upstanding wall 16 of the bottom plate, and the outer face of the pawl 31, the latter having a slot or groove 35$^a$ in which the lower arm 39$^b$ of the spring fits.

Figure 7:
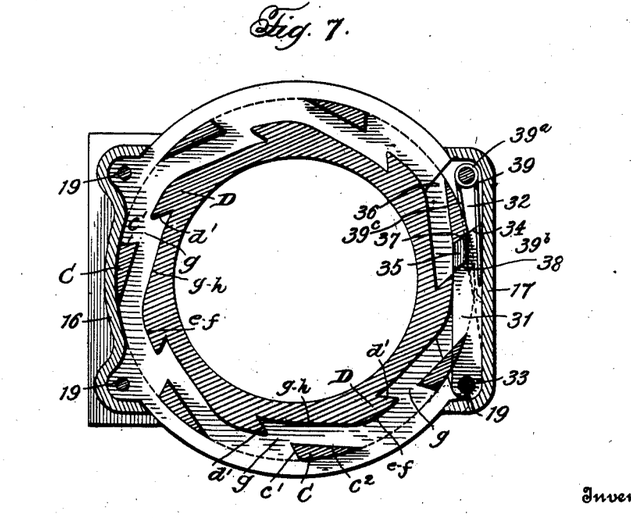
Figure 7 is a detail sectional view of the pawl and ratchet mechanism.
Figures 8, 9, 10, 11, 12, 13, 14, 15, 16:
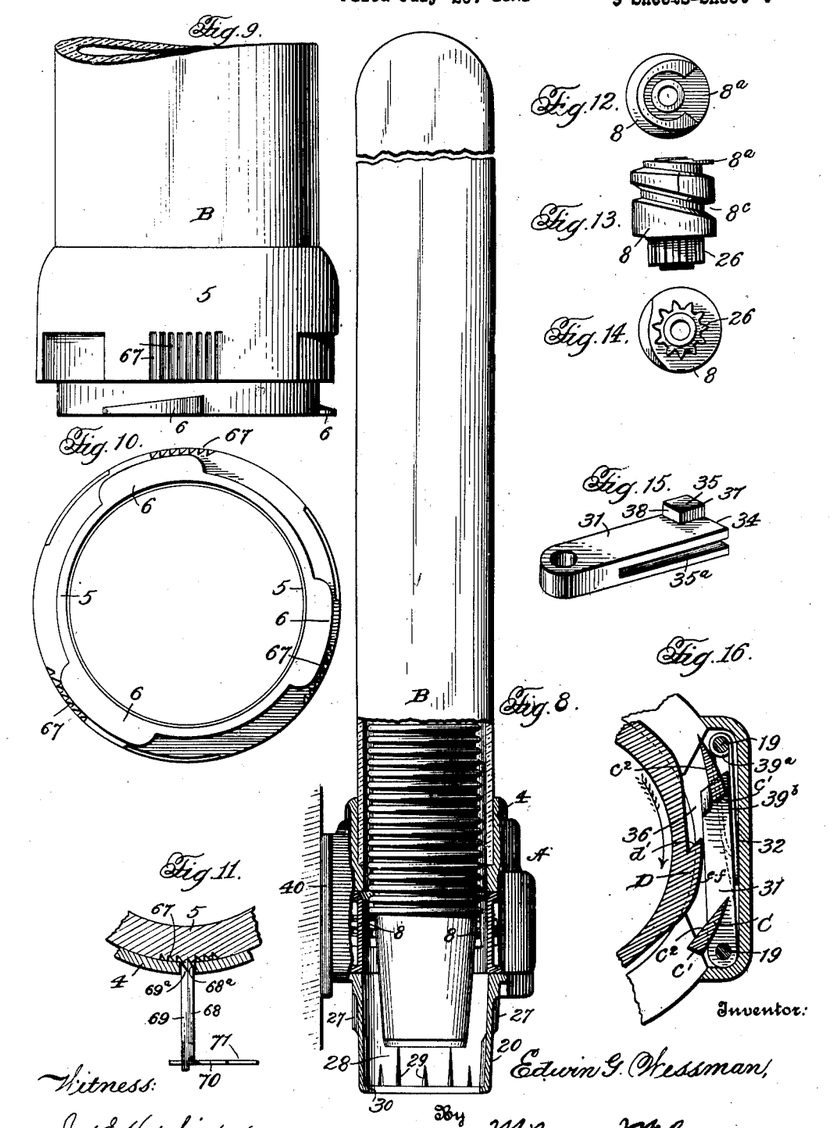
Figure 8 is a side elevation with parts shown in section.
Figure 9 is a side elevation of the lower portion of the container.
Figure 10 is a bottom plan view of the container.
Figure 11 is a detail section of the locking mechanism for the container.
Figures 12, 13 and 14 are detail views of one of the rotary escapement members or worms.
Figure 15 is a detail perspective view of the pawl member of the pawl and ratchet mechanism.
Figure 16 is a detail section of the pawl and ratchet locking mechanism for the tubular operating member.
Figure 17:
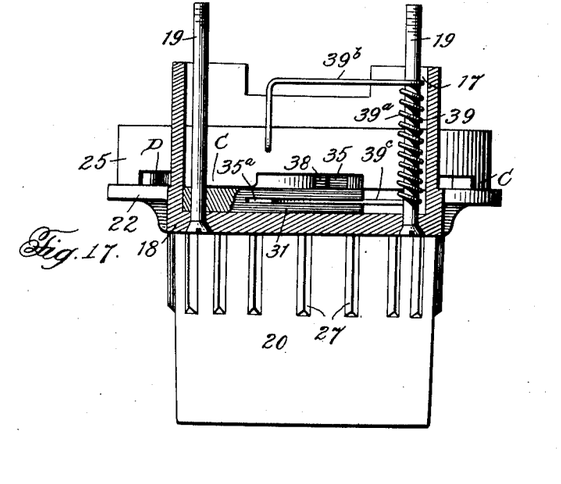
Figure 17 is a partial side elevation and vertical section of the lower part of the apparatus.

In Fig. 7 of the drawings, the pawl and ratchet mechanism is shown at the completion of a stroke or feeding operation of the tubular operating member 20, and after a cup has been delivered by the cup feeding mechanism, the end face 37 of the tooth 35 of the pawl abutting against the end face $c'$ of one of the teeth $c$, and preventing further rotation of the tubular operating member in the direction of the arrow. When the operator releases his grip upon the tubular operating member, and said tubular operating member is relieved of forward pressure, the pawl impelled by the spring 39, is moved inwardly, the inclined end face 37 of the tooth 35 of the pawl sliding over the end face $c'$ of the ratchet tooth C, causing a slight retrograde movement or rotation of the tubular operating member in the reverse direction, the tooth 35 of the pawl passing through the space between the two adjacent teeth of the respective series behind the face $d'$ of the tooth D of the inner series of teeth, the end face 38 of the tooth of the pawl abutting against the face $d'$, as indicated in Fig. 7 of the drawings. The tubular operating member is now locked against reverse movement but is free for rotation in the direction of the arrow for another feeding operation. Upon rotation of the tubular operating member 20 in the direction of the arrow the side face 35$^a$ of the tooth 35 of the pawl is engaged by the curved portion $h$ of the side face of the adjacent inner tooth $d$ of the ratchet and is cammed outwardly thereby so that upon the completion of the stroke the end face $c'$ of the succeeding tooth of the outer series of teeth C abuts against the end face 38 of the pawl 35, and further rotation is prevented.

The invention comprehends an improved closure, and supporting and locking means therefor comprising a casing part disposed at one side of the casing A and a door or closure plate connected with the casing part to provide for positioning the same within the closure part out of the way and concealed from view, when not in use, and to be readily withdrawn from the casing part to a position to close the delivery opening, with means for locking the closure plate both in its open and closed positions, (see particularly Figs. 3, 5 and 24 to 30, inclusive).

In the special embodiment of the invention illustrated in the drawings, the casing part 40 and locking means is in the form of a separate unit adapted to be detachably connected with the main casing A for the cup delivering mechanism, whereby the cup dispenser may be used with or without the closure and locking means.

The casing part 40 is shown substantially rectangular shaped, having a front plate 41, side walls 42, 43 and top and bottom walls 44, 45. The front plate 41 of the casing part has a recess 46 in the front face thereof adapted to receive the rear rectangular extension 1, and attaching flanges 2 of the casing A (see particularly Fig. 4), the parts being secured to each other by screws 47, the casing A, with the casing part 40 attached thereto, being secured to any suitable support by the screws 3. 48 designates the door or closure plate which is adapted to be moved into and out of the casing part 40 through an opening 49 in its front and bottom walls. The door or closure 48 is provided at one end with trunnions 50 adapted to slide over the inner face of the front plate 41 of the casing part, and the adjoining rear face portion 2$^a$ of the flanges 2, the trunnions having flat front face portions 50$^a$ and rounded portions 50$^b$. When the closure plate is withdrawn from the casing, the trunnions 50 engage bearings 51 on the lower portion of the casing part, a hinged connection being thus afforded so that the closure plate may be swung upwardly to fit against and close the lower end of the tubular part 20. The door or closure plate 48 has at its outer end a cylindrical boss or projecting part 52, which is adapted to fit nicely within the annular lip or flange 30 at the lower end of the tubular part 20, and the end of the closure plate 48 is semi-circular shape to correspond with the curvature of the tubular part 20. Extending forwardly from the cylindrical boss or projecting part 52 is a series of teeth 53, said teeth being adapted, when the door or closure plate 48 is in closed position, to fit upon the upper face of the lip 30 and between the ribs 27 on the interior of the tubular part, and lock the same against rotation.

The means for locking the door or closure plate 48 comprises a lock plate 54 arranged in the casing part 40 at the rear of the closure plate, and provided with a yoke 55 at its upper end engaging a crank or eccentric 56 on a transverse shaft 57 supported for rotation in the upper portion of the casing part 40. The lock plate 54 has guide ribs 58, and inclined face portions 59 on the rear face thereof to cooperate with inclined faces 60, 61, on the casing part. The lock plate 54 is adapted to be supported by the transverse shaft 57 in an upper position with the inclined face portions 59 out of engagement with the inclined faces 60, 61, so that the closure plate may be moved into or out of the casing part, and is free for movement to engage or disengage the same with the tubular part 20. By giving the shaft 57 a half turn in the direction of the arrow (see Fig. 3 of the drawings), the lock plate 54 will be moved downwardly and inwardly, the inclined face portions 59 engaging the inclined faces 60, 61 on the casing part, to a position to engage and hold the closure plate within the casing (see Fig. 3) or to hold the closure plate in closed position, (see Fig. 5), in the latter case the lower end of the lock plate 54 engaging the rear end of the closure plate 48. By rotating the shaft 57 another half turn in the direction of the arrow, the lock plate 54 will be moved upwardly and rearwardly to inoperative position. The shaft 57, at one end is provided with a slot 57$^a$ and arranged to slide longitudinally therein is a lock pin 62, said pin 62 having a stem 62$^a$ working in a longitudinal bore 63 in the shaft 57. 64 designates a coiled spring acting to force the lock pin 62 outwardly into engagement with a slot 65 in the casing part 40, the pin being adapted to engage the slot, and lock the shaft 57 against rotation when the lock plate 54 has been moved to its operative or inoperative positions. The lock pin 62 is adapted to be depressed out of engagement with the slot 57$^a$ in the casing part, and the shaft 57 rotated by a key 66 adapted to be inserted through the slot 65 which extends to the exterior of the casing part 40.

Means is also provided for locking the cup container B to the casing A. The collar 5 at the lower end of the cup container is provided with series of teeth 67. Cooperating with the series of teeth 67 are two pawls 68, 69, arranged side by side, and provided with teeth 68$^a$, 69$^a$. 70, 71 designate springs which act to force the pawls 68, 69 inwardly into engagement with the teeth 67 of the collar 5, each of said springs being secured at one end to the casing part 40 by a screw 73, and having their outer portions engaging notches 74, 75 in the inner ends of the pawls. The notches 74, 75 are of different depth and alternately arranged as shown, said pawls being adapted to operate independently of each other in engaging the notches between the teeth 67 of the collar 5. The pawls 68, 69 are provided with slots 68$^b$, 69$^b$ to engage the eccentric 56 on the shaft 57, the eccentric being adapted, when the shaft is turned to move the lock plate 54 to inoperative position, to also retract the pawls from engagement with the teeth 67 of the collar.

It will be noted that the locking means for the tubular operating part 20, that for the closure plate 48 and for the cup container B have a common key control, at the same time provision being made for locking the cup container B to the casing when the apparatus is in use, as well as when the door or bottom plate 40 is locked in closed position.

Subject matter shown in this application but not claimed, is claimed in my copending case Serial No. 527,900 filed January 9, 1922.

What I claim is:—

1. In an apparatus of the class described, a cup container, escapement mechanism for delivering cups singly from the container, and a tubular part at the lower end of the container adapted to receive and hold the cups as they are delivered from the container in position for withdrawal with a lower portion of the cup projecting outside of the same, said tubular part being axially rotatable and adapted to be turned by hand to operate the escapement mechanism.

2. In an apparatus of the class described, a cup container, escapement mechanism for delivering cups singly from the container and a tubular part at the lower end of the container adapted to receive and hold the cups as they are delivered from the container in position for withdrawal with a lower portion of the cup projecting outside of the same, said tubular part being axially rotatable and adapted to be turned by hand to operate the escapement mechanism, and means for limiting the extent of continuous rotary movement of said tubular part whereby the escapement mechanism is only actuated to make a single release upon each operation of the tubular part.

3. In an apparatus of the class described, a cup container, escapement mechanism for delivering cups singly from the container and a tubular part at the lower end of the container adapted to receive and hold the cups as they are delivered from the container in position for withdrawal with a lower portion of the cup projecting outside of the same, said tubular part being axially rotatable and adapted to be turned by hand to operate the escapement mechanism, and means for limiting the extent of continuous rotary movement of said tubular part whereby the escapement mechanism is only actuated to make a single release upon each operation of the tubular part, said means after each operation of the tubular part acting to prevent further rotation thereof until the tubular part is released by the operator.

4. In an apparatus of the class described, a cup container, mechanism for delivering cups singly from the container, a tubular part at the lower portion of the container, said tubular part being axially rotatable and adapted to be turned by hand to operate the cup delivering mechanism, and means permitting repeated operations of said tubular part, but limiting the extent of movement of the same at each operation thereof, whereby the cup delivering mechanism is only operated to make a single release upon each operation of said tubular part.

5. In an apparatus of the class described, a cup container, escapement mechanism for delivering cups singly from the container, and operating means for said escapement mechanism including an axially rotatable tubular part constituting a continuation of the container.

6. In an apparatus of the class described, a cup container, escapement mechanism for delivering cups singly from the container, a rotatable hand operated actuating member adapted to be turned in one direction only to actuate the escapement mechanism, means for preventing rotation of said actuating member in the opposite direction, and means acting automatically to permit repeated operations of the actuating member in the same direction to operate the escapement mechanism but limiting the extent of movement of the actuating member at each operation thereof whereby the escapement mechanism is only actuated to make a single release upon each operation of the actuating member.

7. In an apparatus of the class described, a cup container, escapement mechanism for delivering cups singly from the container, a rotatable actuating member adapted to be turned by hand in one direction only to actuate the escapement mechanism, and means acting automatically to permit repeated operations of the actuating member in one direction to operate the escapement mechanism but limiting the extent of movement of the actuating member at each operation thereof whereby the escapement mechanism is only actuated to make a single release upon each operation of the actuating member, said means after each operation of the actuating member acting to prevent further rotation thereof in the same direction until the actuating member is released by the operator.

8. In an apparatus of the class described, a cup container, escapement mechanism for delivering cups singly from the container, a rotatable hand operated actuating member adapted to be turned in one direction only to actuate the escapement mechanism, and means acting automatically to permit repeated operations of the actuating member in the same direction to operate the escapement mechanism but limiting the extent of movement of the actuating member upon each operation thereof whereby the escapement mechanism is only actuated to make a single release upon each operation of the actuating member.

9. In an apparatus of the class described, a container for a stack of nested cups, the cups having lateral flanges spaced apart when the cups are nested, a plurality of rotary worm members disposed about the discharge end of the container and adapted to feed the cups singly from a stack of nested cups within the container, said worm members being arranged with their axes of rotation extending at an inclination in planes substatially parallel with the longitudinal axis of the container, and operating means for the worms.

10. In an apparatus of the class described, a cup container, mechanism for delivering cups singly from the container, said mechanism comprising a plurality of rotary worm members, an annular rotatable manually operable actuating member adapted to be turned in one direction only to operate the rotary worm members, each worm member having a pinion thereon, and the actuating member having a gear meshing with the pinions of the worm members, means for preventing rotation of the actuating member in one direction, and means acting automatically to permit repeated operations of the actuating member in one direction to operate the escapement mechanism but limiting the extent of movement of the actuating member at each operation thereof whereby the escapement mechanism is only actuated to make a single release upon each operation of the actuating member.

11. In an apparatus of the class described, a cup container, a casing at the lower portion of the cup container, said casing having a circular opening and annular bearing at its lower end, escapement mechanism in the casing for delivering cups singly from the container, and operating means for the escapement mechanism including a tubular part extending from the lower end of the casing and supported upon the casing for axial rotation, said tubular part engaging the annular bearing face on the bottom wall of the casing and having a collar rotatably engaging the upper face of said bottom wall.

12. In an apparatus of the class described, a cup container, a casing at the lower end of the cup container, mechanism for delivering cups singly from the container including a plurality of rotatable escapement members, supported in the casing about the lower end of the container, each of said escapement members having a pinion on the lower portion thereof, and operating means for the escapement mechanism including a tubular part extending from the lower end of the casing, and supported for axial rotation thereupon, said tubular part engaging the annular bearing on the bottom wall of the casing and having a collar rotatably engaging the upper face of said bottom wall, and an annular gear member on said collar meshing with the pinions of the rotatable escapement members.

13. In an apparatus of the class described, a cup container, escapement mechanism for delivering cups singly from the container, a rotatable actuating member for the escapement mechanism adapted to be turned by hand in one direction, and automatic means limiting the extent of continuous rotary movement of the actuating member at each operation thereof, said means acting to lock the rotatable actuating member against movement in the reverse direction after each feeding operation thereof.

14. In an apparatus of the class described, a cup container, escapement mechanism for delivering cups singly from the container, a rotatable actuating member for the escapement mechanism, and means permitting repeated operations of the actuating member but limiting the extent of movement of the same at each operation, said means including a ratchet comprising inner and outer circular series of teeth, the teeth of each series being arranged at regular intervals and the teeth of one series alternating with the teeth of the other series with spaces therebetween, and a pawl cooperating with one of the series of teeth to limit the movement of the operating member in one direction, and the other series of teeth acting to move the pawl into engagement with the first mentioned teeth.

15. In an apparatus of the class described, a cup container, escapement mechanism for delivering cups singly from the container, a rotatable actuating member for the escapement mechanism, and means permitting repeated operations of the actuating member, but limiting the extent of movement of the same at each operation, said means including a ratchet comprising inner and outer circular series of teeth, the teeth of each series being arranged at regular intervals, and the teeth of one series alternating with the teeth of the other series with spaces therebetween and a pawl cooperating with one series of teeth to limit the movement of the operating member in one direction, and the other series of teeth serving to lock the operating member against movement in the reverse direction after each feeding operation thereof.

16. In an apparatus of the class described, a cup container, escapement mechanism for delivering cups singly from the container, a rotatable actuating member for the escapement mechanism, a ratchet on the actuating member comprising inner and outer circular series of teeth, the teeth of each series being arranged at regular intervals with the teeth of one series alternating with the teeth of the other series with spaces therebetween, and a pawl pivotally supported to extend tangentially of the actuating member, means for impelling the free end of the pawl radially of the series of teeth cooperating with the pawl to limit the extent of movement of the actuating member in its feeding operation, and the other series of teeth acting to force the pawl in opposition to said pawl impelling means in position to engage the first mentioned series of teeth.

17. In an apparatus of the class described, a cup container, a casing at the lower part of the container, said casing having a circular opening and annular bearing at its lower end, escapement mechanism in the casing for delivering cups singly from the container, and operating means for the escapement mechanism including a tubular part extending from the lower end of the container and supported upon the casing for axial rotation, said tubular part engaging the annular bearing on the bottom wall of the casing and having a collar rotatably engaging the upper face of said bottom wall, and means for limiting the extent of continuous rotary movement of the tubular operating member, said means including a ratchet on the bottom face of said collar and a pawl mounted in the casing to one side of the collar to cooperate with said ratchet.

18. In an apparatus of the class described, a cup container, mechanism for delivering cups singly from the container, an axially rotatable tubular part at the delivery end of the apparatus adapted by rotation thereof to operate the cup delivering mechanism, and a door member to close the lower end of said tubular part, and means on said door member adapted to engage a part on said tubular part and lock the same against rotation when the door member is in closed position.

19. In an apparatus of the class described, a cup container, mechanism for delivering cups singly from the container, an axially rotatable tubular part at the delivery end of the apparatus adapted by rotation thereof to operate the cup delivering mechanism, said tubular part having an inwardly extending annular lip at its lower end, a door member to close the lower end of the tubular part supported at one end for pivotal sliding movement relatively thereto, the door member having a part adapted to fit against the lower end of the tubular part, and also an extension at its free end adapted to rest upon the upper face of the lip when the door member is in closed position.

20. In an apparatus of the class described, a cup container, mechanism for delivering the cups singly from the container, an axially rotatable tubular part at the delivery end of the apparatus adapted by rotation thereof to operate the cup delivering mechanism, said tubular part having a longitudinally extending rib on its inner face, a plate to close the lower end of said tubular part supported at one end for pivotal sliding movement relatively thereto. the plate having a notched extension at its free end adapted to engage the rib on the tubular member and lock the same against rotation when the closure plate is in closed position, and means for locking the closure plate in closed position.

21. In an apparatus of the class described, a cup container, mechanism for delivering cups singly from the container, an axially rotatable tubular part at the delivery end of the apparatus adapted by rotation thereof to operate the cup delivering mechanism, a door to close the lower end of the tubular part, means for locking the door in closed position, and means for locking the rotatable tubular part against rotation, and a single key-operated control for both of said means.

22. In an apparatus of the class described, a casing having a socket and a delivery opening, a cup container detachably seated in the socket, a door to close the delivery opening, means for locking the cup container in the socket, and means for locking the door in closed position, and a single key-operated control for both of said locking means.

23. In an apparatus of the class described, a casing having a socket, a cup container detachably seated in the socket, mechanism for delivering cups singly from the container, an axially rotatable tubular part at the delivery end of the apparatus, adapted by rotation thereof to operate the cup delivering mechanism, a door to close the lower end of said tubular part, means for locking the container in the socket, means for locking the door in closed position, means for locking the rotatable tubular part against rotation, and a single key operated control for all of said locking means.

24. In an apparatus of the class described, a cup container, escapement mechanism for delivering cups singly from the container, and a tubular part forming a continuation of the container, said tubular part being rotatable and adapted to be gripped by the hand and turned to operate the escapement mechanism.

25. In an apparatus of the class described, a cup container, escapement mechanism for delivering cups singly from the container, and a tubular part at the lower end of the container and forming a continuation thereof, said tubular part being rotatable and adapted to be gripped by the hand and turned to operate the escapement mechanism.

26. In an apparatus of the class described, a cup container, escapement mechanism for delivering cups singly from the container, operating means for said escapement mechanism including an axially rotatable tubular part constituting a continuation of the container, and means for limiting the extent of continuous rotary movement of said tubular part whereby the escapement mechanism is only actuated to make a single release upon each operation of the actuator member, said means after each operation of the tubular part acting to prevent further rotation thereof until the tubular part is released by the operator.

27. In an apparatus of the class described, a cup container, escapement mechanism for delivering cups singly from the container, a tubular part forming a continuation of the container, said tubular part being rotatable and adapted to be gripped by the hand and turned to operate the escapement mechanism, and means preventing rotation of the actuating member in one direction, and acting to limit the extent of continuous rotary movement of the actuating member whereby the escapement mechanism is only actuated to make a single release upon each operation thereof, said means after each operation of the actuating member acting to prevent further rotation thereof in the same direction until the actuating member is released by the operator.

28. In an apparatus of the class described, a cup container, escapement mechanism for delivering cups singly from the container, an annular rotatable actuating member for the escapement mechanism, said actuating member being operable in one direction only to actuate the escapement mechanism, and pawl and ratchet mechanism permitting repeated actuations of the actuating member, but limiting the extent of movement of the same at each operation thereof, whereby the escapement mechanism is only operated to make a single release upon each operation of the actuator member, said pawl and ratchet mechanism after each operation of the actuating member acting to prevent further rotation thereof in the same direction until released by the operator.

29. In an apparatus of the class described, a container for a stack of nested cups having lateral flanges spaced apart when the cups are nested, a plurality of rotary worm members disposed about the discharge end of the container and adapted to feed the cups singly from a stack of nested cups within the container, the worm members having transversely beveled face portions to engage the flanges of the cups, and said worm members being arranged with their axes of rotation extending at an inclination in planes substantially parallel with the longitudinal axis of the container, and operating means for the worms.

30. In an apparatus of the class described, a container for a stack of nested cups having lateral flanges spaced apart when the cups are nested, a plurality of rotary worm members disposed about the discharge end of the container and adapted to feed the cups singly from a stack of nested cups within the container, said worm members being arranged with their axes of rotation extending at an inclination in planes substantially parallel with the longitudinal axis of the container, each of said worms being provided with a pinion, the teeth of said worm pinions being inclined to the longitudinal axis of the worms, and a rotary actuating gear member disposed to rotate in a plane at right angles to the longitudinal axis of the container, said gear member meshing with the pinions of the worms.

31. A device of the character specified, comprising in combination with a casing having a discharge opening, a plurality of discharge members rotatably mounted in said casing, each of said members being provided with an external thread forming a spiral of a plurality of turns, the pitch of said thread gradually increasing from the top to the bottom thereof, each turn of said thread being arranged to engage between adjacent flanges of cups in said casing so that said thread will act upon a series of said cups gradually to separate the cup flanges and cups as the same approach said discharge opening, whereby the lowermost cup is discharged through said opening by the action of the lowest turn of said thread.

32. A device of the character specified, comprising in combination with a casing having a discharge opening, a plurality of discharge members rotatably mounted in said casing, each of said members being provided with an external thread forming a spiral of a plurality of turns, the pitch of said thread gradually increasing from the top to the bottom thereof, each turn of said thread being arranged to engage between adjacent flanges of cups in said casing so that said thread will act upon a series of said cups gradually to separate the cup flanges and cups as the same approach said discharge opening, whereby the lowermost cup is discharged through said opening by the action of the lowest turn of said thread, an internal gear mounted in said casing, means for operating said internal gear, and a gear mounted in connection with each of said discharge members and in mesh with said internal gear, whereby said discharge members are actuated by the operation of said internal gear.

33. A device of the character specified, comprising in combination with a casing having a discharge opening, a plurality of discharge members rotatably mounted in said casing, each of said members being provided with an external thread forming a spiral of a plurality of turns, the pitch of said thread gradually increasing from the top to the bottom thereof, each turn of said thread being arranged to engage between adjacent flanges of cups in said casing so that said thread will act upon a series of said cups gradually to separate the cup flanges and cups as the same approach said discharge opening, whereby the lowermost cup is discharged through said opening by the action of the lowest turn of said thread, an internal gear mounted in said casing, a gear mounted in connection with each of said discharge members and in mesh with said internal gear, whereby said discharge members are actuated by the operation of said internal gear, and means for intermittently operating said internal gear in a uniform direction.

34. A device of the character specified, comprising in combination with a casing having a discharge opening, a plurality of discharge members rotatably mounted in said casing, each of said members being provided with an external thread forming a spiral of a plurality of turns and increasing in pitch at its lower part, each turn of said thread being arranged to engage between adjacent flanges of cups in said casing so that said thread will act upon a series of said cups to separate the cup flanges and cups as the same approach the discharge opening.

35. In an apparatus of the class described, a housing for cups, mechanism for delivering cups singly from the housing, a portion of said housing for the cups being axially rotatable and adapted by rotation to operate the cup delivering mechanism.

36. In an apparatus of the class described, a casing having a delivery opening and a socket part, a cup container detachably seated in said socket part, a door casing extending along one side of the first mentioned casing, a door adapted to slide within the door casing and to be withdrawn therefrom in closed position over the delivery opening, means for locking the door in open and closed positions, and for locking the cup container to the casing when the closure plate is locked, and a single key operated control for both of said locking means.

In testimony whereof I hereunto affix my signature.

EDWIN G. WESSMAN.